Inventor
T CYRIL NOON

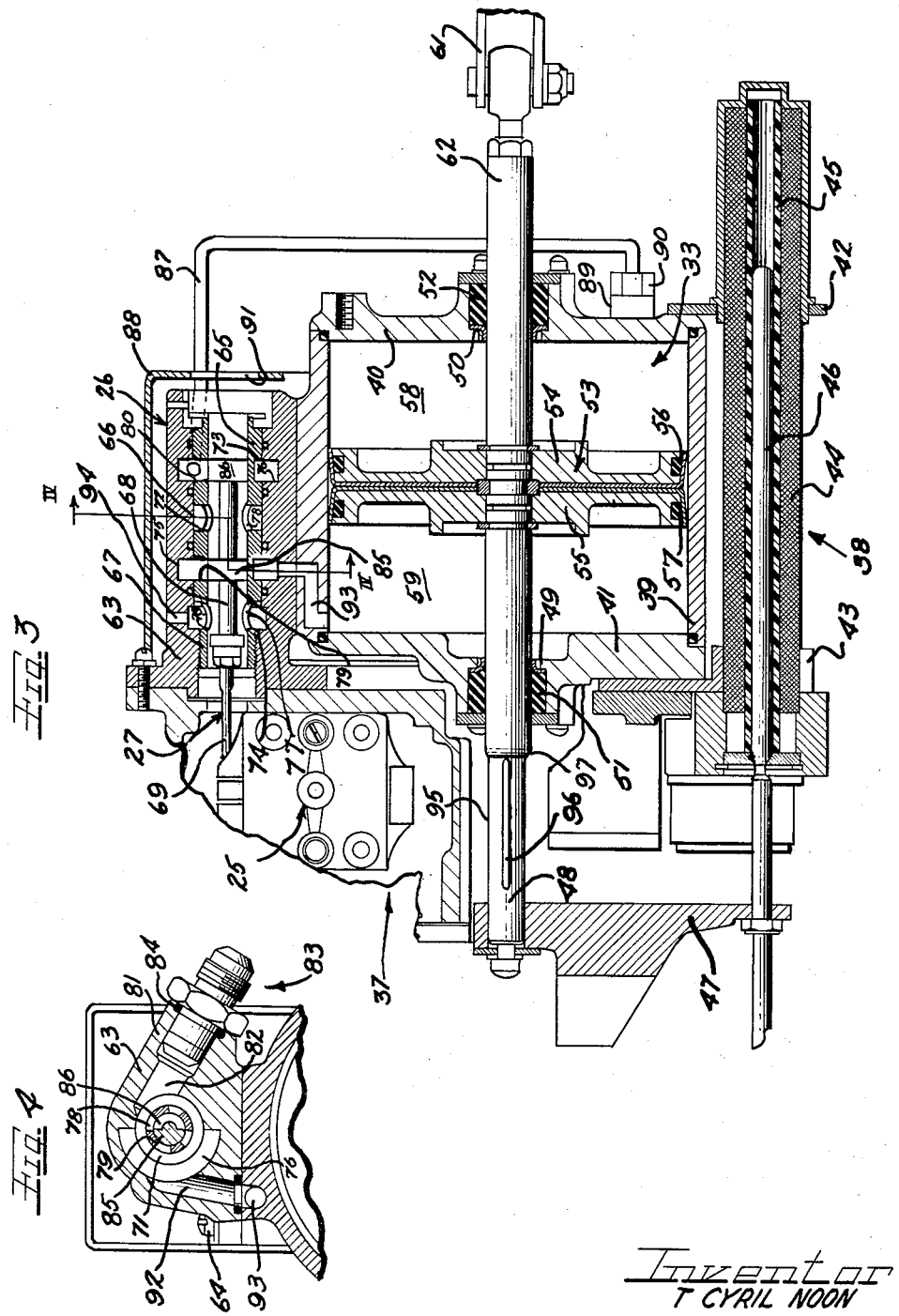

United States Patent Office

2,927,591
Patented Mar. 8, 1960

2,927,591

CONTROL VALVE ACTUATOR SYSTEM FOR ALTERNATOR DRIVE TURBINE

T Cyril Noon, Cleveland Heights, Ohio, assignor to Thompson Ramo Wooldridge Inc., a corporation of Ohio Application June 20, 1955, Serial No. 516,596

2 Claims. (Cl. 137—30)

The present invention relates to actuator systems, and more particularly to double acting piston-cylinder actuator systems and method and apparatus improving the operating characteristics thereof.

In an alternator control system such as that disclosed in the application for United States Letters Patent by Walter R. Chapman and Stephen H. Fairweather, entitled "Control System for Turbine Driven Alternators," U.S. Serial No. 382,582, filed September 28, 1953, issued April 23, 1957, as U.S. Patent No. 2,790,091 the control system senses the load and the speed of the alternator to energize and displace an actuator to control the pneumatic energy supplied to the turbine driving alternator whereby the frequency or speed of the alternator may be maintained substantially constant, or provided with a manufactured droop characteristic, and the load on the alternator, when operating in parallel with other alternators may be maintained as an equal part of the total load.

During starting operations of the control system a maximum signal is first supplied to the actuator due to the wide variance between the actual speed of the alternator and the preselected speed therefor. As the alternator approaches its proper operating speed, however, there is a slight reversal in signal due to slight overrunning and to prevent further overrunning of the alternator from its preselected speed. At the time of this reversal signal, it is important that the actuator respond very quickly in order to prevent great overrunning of the alternator.

By the principles of the present invention the speed of response of the actuator and, therefore, the starting characteristics of the control system have been greatly improved and the efficiency of the starting operation has been highly improved. The actuator includes a double-acting piston-cylinder assembly into which high pressure air is fed and vented respectively by a pilot valve directly connected to the control system. The double-acting piston-cylinder assembly is connected to the main air line valve controlling the supply of pneumatic energy to the air turbine. Under ordinary operating conditions, action of the pilot valve is such that when it is moved to admit high pressure air to one side of the piston within the cylinder it also vents the other side of the piston to the atmosphere to permit displacement of the piston within the cylinder. Under starting conditions, however, the piston is displaced substantially fully to one end of the cylinder and the reversal signal displacing the pilot valve for admitting high pressure to that end of the actuator piston tends to cause the piston to reverse its position. To vent the highly pressurized cylinder through the pilot valve alone has been found to be relatively slow, under these conditions even though it is quite sufficient and highly efficient under normal operating conditions. It is, therefore, a principal object and feature of the present invention to provide a new and improved method and apparatus whereby pressure is reduced in the pressurized end of the cylinder at least when the piston is substantially fully displaced in one direction in the cylinder prior to energization of the actuator for displacement of the piston in an opposite direction whereby the response time of the actuator is diminished and improved.

This object and feature of the invention is accomplished by a method and apparatus effective to bleed down the pressurized end of the cylinder, thereby substantially decreasing the required venting of the cylinder through the pilot valve on the occasion of a reversal of the pilot valve position.

Another object and feature of the present invention is to provide a new and improved actuator with means to bleed down displacing pressurized fluid therein.

Still another object of the present invention is to provide a new and improved method of increasing the response and efficiency characteristics of a pneumatic actuator.

Still another object of the present invention is to provide new and improved means to bleed down the pressurized chamber in a piston-cylinder actuator when the piston is substantially fullly displaced towards one end thereof.

Still another object of the present invention is to provide a new and improved piston-cylinder assembly wherein the piston rod carrying the piston has a reduced or grooved or flatted end portion whereby full displacement of the piston towards one end of the cylinder will permit bleeding of pressurized fluid from the cylinder through the piston rod bearing over the reduced or flatted or grooved portion of the piston rod.

Still another object of the present invention is to provide a new and improved actuator assembly with a pilot valve and double-acting piston-cylinder actuator with the piston defining a pair of chambers within the cylinder and the pilot valve being operative to admit high pressure fluid to said chambers respectively and vent the chambers respectively and means is provided to bleed down a chamber into which high pressure fluid is admitted whereby reversal displacement of the piston is facilitated.

Still other objects, features and advantages of the present invention will become readily apparent from the following detailed description of the present invention and an embodiment thereof, from the claims, and from the accompanying drawings in which each and every detail shown is fully and completely disclosed as a part of this specification, in which like reference numerals refer to like parts, and in which:

Figure 3 is a broken sectional view of the actuator of Figure 2 viewed as taken substantially along the line III—III of Figure 2; and Figure 4 is a broken fragmental sectional view of the pilot valve viewed as taken substantially along the line IV—IV of Figure 3.

As shown on the drawings:

Figure 1:
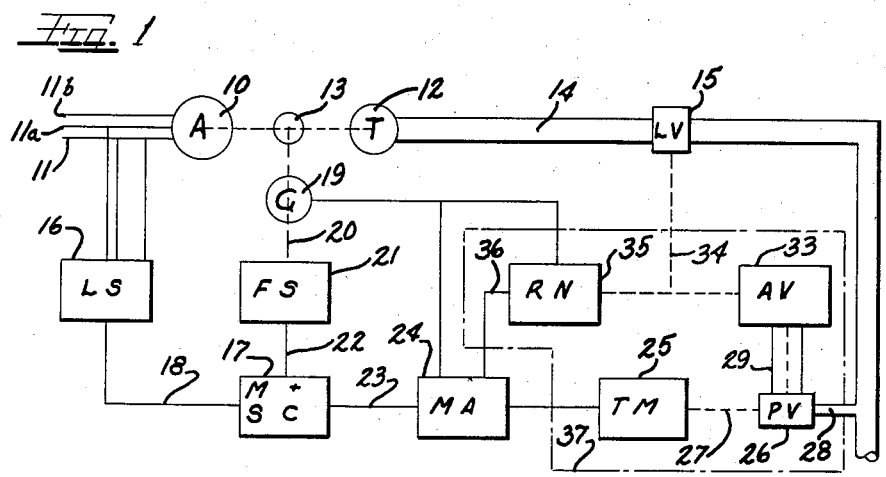
Figure 1 is a diagrammatic and schematic illustration of a control system in which an actuator embodying the principles of the present invention may be utilized.

While it will be appreciated that method and apparatus embodying the principles of the present invention are of general utility, the embodiment of the invention disclosed herein is illustrated and described in conjunction with an alternator control system such as that disclosed in the above identified copending application for patent by Walter R. Chapman and Stephen H. Fairweather as one type of installation advantageously utilizing the instant invention. Thus, there is illustrated in Figure 1 a control system for an alternator 10 having output leads 11, 11a and 11b. The alternator 10 is driven by a turbine 12 which is here illustrated as a pneumatic turbine driving the alternator 10 through a gear box 13 or the like. Pressurized air for pneumatic energy for the turbine is supplied through an air line 14 including a line valve 15. Control of the line valve 15 is effective to control pneumatic energy to the turbine 12 and thereby control speed and torque for the alternator 10.

The load on the alternator 10 is sensed by a load-sensing network 16 coupled to the lines 11 and 11a of the alternator 10 and having an output supplied to a mixer and starting control network 17 supplied over a line 18 and proportional to the load on the alternator. A tachometer generator 19 is mechanically coupled to the gear box 13 and has an output lead 20 supplying an input signal to a frequency-sensing or discriminating or speed-sensing network 21 having an output supplied over the line 22 also to the mixer and starting control network 17. In the mixing and starting control network 17 the signals are mixed and supplied over a line 23 to a magnetic amplifier 24 which is also supplied with energy from the tachometer generator 19. The output from the magnetic amplifier 24 controls a torque motor 25 thereby controlling displacement of the piston in a pilot valve 26 which is mechanically coupled to the torque motor 25 as indicated by the broken mechanical coupling line 27. The pilot valve is supplied with pressurized air over a tap-off tube 28 connected with the air supply line 14 downstream from the line valve 15 and controllably supplies air through the air passages 29 to the actuator valve 33 which in turn is mechanically coupled, as indicated at 34 to the line valve 15 to control air supply to the turbine 12, thereby controlling the operating characteristics of the alternator 10 to maintain the speed of the alternator 10 substantially constant, or to provide the same with a manufactured droop characteristic as desired, and as described in the above described copending application of Walter R. Chapman and Stephen H. Fairweather.

The actuator 33 is also coupled mechanically to a reset network 35 which is supplied with energy from the tachometer generator 19 and has an output signal which is fed back to the magnetic amplifier 24 over the line 36 whereby the control system is provided with a feed back effective to bring the speed of the alternator up to the desired level, rather than permit the same to find a new lower operating level whenever the load on the alternator is increased.

Figure 2:
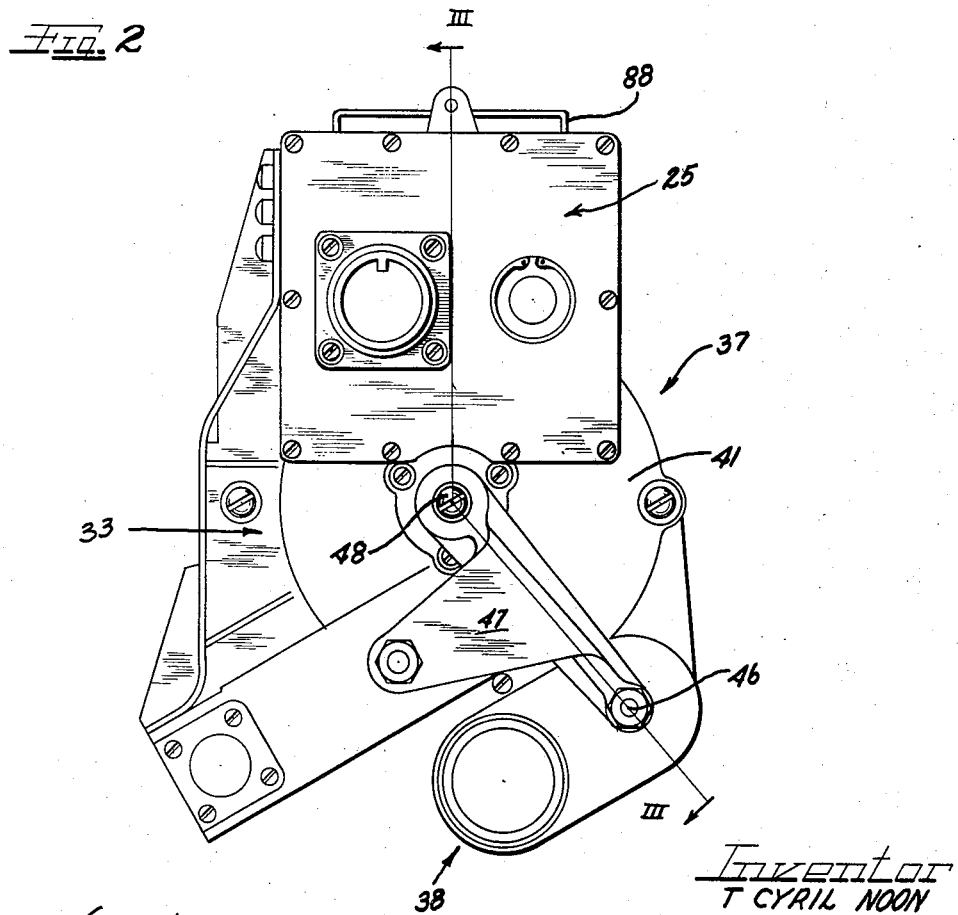
Figure 2 is an end elevational view of an actuator assembly embodying the principles of this invention.

While the details of the components and the characteristics of the operating parts and features of the system are disclosed in the aforementioned copending application, the pilot valve, the actuator, the reset network and the torque motor have all been enclosed in a broken line box 37 in Figure 1 to indicate that they are primarily all a part of a single assembly which is hereinafter termed an actuator assembly and which is illustrated in structural detail in Figures 2, 3 and 4. It will be understood, of course, that many of the component parts of the electrical system of the reset network are not included in the actuator assembly, but the actuator assembly does specifically include at least an important part of the reset network, namely the displacement transformer indicated generally at 38 in the illustrations of the actuator assembly in Figures 2 and 3.

The actuator assembly 37 includes a cylinder body 39 for the actuator piston-cylinder 33 onto which there is secured a cylinder cap 40 and a cylinder head 41. To the cap 40 and head 41, the displacement transformer 38 is secured by appropriate brackets 42 and 43 respectively secured to the cap 40 and the head 41 and supporting the transformer windings 44 in which a hollow core 45 slidably axially supports a movable and displaceable magnetizable material core 46.

This magnetizable core 46 extends outwardly axially from the transformer windings 44 in the direction of the head end of the piston-cylinder group 33 where it is secured by a bracket 47 to the head end extremity of a piston rod 48 extending through axial bores 49 and 50 in the head 41 and cap 40, respectively. A pair of seals and bearings 51 and 52 in the apertures 49 and 50 radially support the piston rod 48 for axial movement by a piston 53 secured to the rod 48. By securing the bracket 47 to both the piston rod and the transformer core, movement of the piston 53 in the piston-cylinder assembly group 33, the transformer core 46 of the reset network transformer 38 will have equal movement with the displacement of the piston 53.

The piston-cylinder group 33 is of the double-acting type and for that purpose, the piston 53 is a double face type piston having a pair of sections 54 and 55 respectively facing the cap 40 and head 41 and provided with pressure seal means 56 and 57 along the outer peripheries thereof. Thus, the piston section 54 cooperates with the cylinder body 39 and the cap 40 to define a first fluid chamber 58, while the second piston section 55 and the head 41 together with the cylinder body 39 define a second fluid chamber 59. It will be readily observed that fluid pressure in the chamber 58 in excess of the fluid pressure in the chamber 59 will cause the piston 53 and the rod 48 to move to the left as viewed in Figure 2, while a reverse condition will cause reverse movement. Movement of the piston 53 and the rod 48 not only causes movement of the transformer core 46 but also movement of the air line valve 15 (Figure 1) since the rod 48 is coupled to the valve by an appropriate linkage 60 including a universal joint 61 secured to the cap end 62 of the piston rod 48.

Pressurized fluid is supplied to the chambers 58 and 59 of the piston-cylinder 33 and the chambers are respectively vented through the pilot valve 26 which is controllably displaced by the torque motor 25. The pilot valve 26 includes a cylinder casing or housing 63 which is secured to the cylinder 39 by screws or the like 64 (Figure 4). A sleeve 65 is fitted into an axial bore 66 in the cylinder housing 63 and fixed therein by mating threads 67 at one end of the sleeve 65 and an end of the bore 66 in the cylinder housing 63. The sleeve 65 receives a double piston and rod element 68 slidably arranged therein and connected at one end by a rod link 69 to the torque motor 25. The torque motor 25 thus controllably displaces the piston element 68 in the pilot valve 26 and the rod link 69 corresponds to the indicated mechanical coupling 27 of Figure 1. The mating threads 67 in the sleeve and cylinder housing are so disposed on the respective elements that a plurality of axially spaced peripheral recesses 70, 71, 72 and 73 in the outer periphery of the sleeve are matchingly placed to be in fluid communication with a plurality of inner peripheral recesses 74, 75 and 76 in the cylinder housing 63 respectively communicating with the recesses 70, 71 and 73 in the sleeve 65. In this pilot valve there need be no inner peripheral recess in the cylinder housing 63 corresponding with the peripheral recess 72 in the sleeve 65. Additionally, a plurality of radial apertures 77 in the sleeve 65 are provided for fluid communication between the hollow interior of the sleeve 65 and the grooves 70 and 74, while a further plurality of radial apertures 78 in the sleeve 65 are provided for fluid communication between the inner hollow of the sleeve 65 and the peripheral groove 72. Also, radial apertures 79 communicate the interior of the sleeve 65 with the recesses 71 and 76, while radial apertures 80 are provided for fluid communication between the interior of the sleeve 65 and the recesses 73 and 76.

For the admission of pressurized fluid into the pilot valve, the pilot valve is provided with a boss 81 (Figure 4) having an aperture 82 therethrough communicating with the interior of the cylinder housing 63 in the region of the recess 72 in the sleeve 65. A pneumatic line coupling and union 83 is secured in the outer end of the bore 82 and sealed therein by such means as a gasket O ring 84 whereby the union is sealed and pressurized air admitted thereto via the fluid coupling 28 (Figure 1) will be directed into the pilot valve.

Through these means high pressure fluid is admitted into the sleeve between a pair of pistons 85 and 86 on the piston and rod element 68, the pistons 85 and 86 being axially spaced by a distance equal to the spacing between the apertures 79 and 80 in the sleeve 65 and having an axial dimension substantially equal to or slightly greater than the diameter of the apertures 79 and 80.

When the piston and rod element 68 is displaced to the right in Figure 3, high pressure fluid is admitted into the chamber 58 in the piston-cylinder 33 by passing through the coupling 83 into the recess 72 and thence through the aperture 78 into the interior of the sleeve. From the interior of the sleeve, the pressurized air or other activating fluid passes through the apertures 80 into the recesses 73 and 76 and thence outwardly through the cylinder housing 63 through a coupling and boss substantially the same as the coupling 83 and boss 81 into a tube 87 leading outwardly through a housing cover 88 surrounding the cylinder housing 63 and secured thereto and to the actuator cylinder 39. The tube 87 leads to a boss 89 on the outer face of the cap 40 and an appropriate coupling and union 90 therein secures the tube to the boss 89 whereby fluid passing through the tube 87 may pass into the chamber 58 between the cap 40 and the piston section 54.

When the torque motor 25 displaces the piston and rod element 68 to the left in Figure 3 by an appropriate signal from the control system, the chamber 58 is vented through the tube 87 and thence through the peripheral recesses 73 and 76 and the apertures 80 into the hollow interior of the sleeve 65 and thence to the atmosphere through the right-hand end of the sleeve 65 and an aperture 91 in the cover 88. The central and left-hand sections of the pilot valve are sealed from the atmosphere by the piston 86.

At the same time, high pressure fluid is admitted to the chamber 59 from the hollow interior of the sleeve 65 in the region between the pistons 85 and 86 by passing through the apertures 79 into the recesses 71 and 76 and thence through a bore 92 in the cylinder housing 63 (Figures 3 and 4) communicating with an air passage bore 93 in the cylinder 39 which latter passage bore leads to the chamber 59 at a point substantially adjacent to the head 41 of the piston-cylinder 33. Upon reversal of the displacement of the pilot valve piston and rod element 68, back to the first above described position therefor, the chamber 59 will vent through the passage 93 and the recesses 71 and 76, etc. into the hollow left end of the sleeve 65 from which the pressurized fluid will vent to the atmosphere through the end of the sleeve 65 and through apertures 94 in the cylinder housing to the space within the housing cover 88 and outwardly through the aperture 91.

As described above, upon starting of the alternator 10 (Figure 1), the signal to the torque motor from the control system is a maximum signal to open the line valve 15 by a maximum amount to permit a high pneumatic energy input to the turbine 12. To effect maximum opening of the line valve 15, it is necessary that the actuator 33 be displaced by a maximum amount or have substantially full displacement of the piston 53 in one direction within the piston-cylinder actuator 33. Under these starting conditions, in the embodiment illustrated and described here, the torque motor will be energized to move the pilot valve piston and rod element 68 a maximum displacement to the left (in Figure 3) whereby the chamber 59 of the actuator 33 will be supplied with a maximum of pneumatic energy to displace the piston 53 to the right by substantially full displacement, whereby the piston 53 is substantially adjacent to the cap 40. This will cause movement of the piston rod 48 to the right and through the linkage connections thereto will open the valve 15.

At the end of the starting operations there will be a reversal in the signal from the control system whereby the torque motor will reverse the position of displacement of the pilot valve to a right displacement for admitting pressure into the chamber 58 and venting the chamber 59 as described above. As also described above, it has been found that venting of the chamber 59 under the starting conditions should be relatively fast. In accordance with the principles of this invention, however, it has been found that depressurizing the chamber 59 prior to the reversal of the starting signal or least partially bleeding down the pressure in the chamber 59 prior to the reversal of the starting signal, greatly increases the efficiency of operation of the actuator and reduces the reversal time of the actuator by a factor of about two (2). To that end, the head end of the piston rod 48 is provided with a slightly reduced diameter as at 95 and is further provided with slots or flats or grooves 96 or the like in the reduced diameter region 95 of the head end of the piston rod. The reduction in the diameter is a sloped reduction as at 97 rather than a sharp shouldered reduction in the diameter, whereby the reduced diameter portion may be moved through the bearing seal 51 without damage thereto so that under normal operating conditions such as when the piston is substantially centrally disposed in the cylinder, the seal 51 will be as effective as the seal 52. Dimensionally, the reduced diameter region 95 is so disposed on the piston rod 48 that it will be disposed within the seal 51 only when the piston 53 is substantially fully displaced toward the cap end of the cylinder. When the reduced diameter and slotted or flatted or grooved portion of the rod is disposed within the seal 51, the sealing effects will be broken or nullified and pressure from the chamber 59 will be bled off and reduced. Thus, under starting conditions, when the piston 53 is substantially fully displaced to the right, as viewed in Figure 3, the pressure in the chamber 59 will be bled off and reduced prior to a reversal of the signal whereby reversal of the pilot valve will be effective to cause a quicker reversal of the piston 53. The response time will then be substantially shortened and the efficiency and effectiveness of the control for the alternator 10 will be greatly improved. By this method of bleeding down a pressurized chamber in a double-acting piston-cylinder prior to actuating the same in a reverse direction, the above described advantages will be readily obtained as well as numerous other advantages which are readily apparent and which will become apparent to those skilled in the art and others. It is also apparent that numerous modifications and variations may be effected without departing from the true spirit and scope of the novel concepts and principles of this invention. Therefore, I intend to cover all such modifications and variations as fall within the true spirit and scope of the novel concepts and principles of this invention.

I claim as my invention:

1. In an alternator drive system including a turbine for driving an alternator and a line valve for controlling flow of fluid to the turbine, a piston connected to said valve, a cylinder receiving said piston, pilot valve means operative at alternator speeds below a predetermined value for admitting fluid to one end of said cylinder to actuate said piston in a direction to open said line valve and operative at speeds above said predetermined value to admit fluid to the other end of said cylinder, said line valve being moved to a fully opened position only during starting conditions, and means for allowing free flow of fluid from said one end of said cylinder when said line valve is actuated to said fully opened position.

2. In an alternator drive system including a turbine for driving an alternator and a line valve for controlling flow of fluid to the turbine, a piston connected to said valve, a cylinder receiving said piston, pilot valve means operative at alternator speeds below a predetermined value for admitting fluid to one end of said cylinder to actuate said piston in a direction to open said line valve and operative at speeds above said predetermined value to admit fluid to the other end of said cylinder, said line valve being moved to a fully open position only during starting conditions, a rod extending through said piston on either side thereof and slidably received in the ends of said cylinder, and a reduced portion of said piston extending from one end of said rod to a point between said one end of said rod and said piston whereby free flow of fluid from the end of said cylinder receiving said reduced portion of said rod is afforded when said line valve is actuated to said fully opened position.

References Cited in the file of this patent

UNITED STATES PATENTS

| | | |
|---|---|---|
| 695,675 | Ebel | Mar. 18, 1902 |
| 1,057,554 | Jacobs | Apr. 1, 1913 |
| 1,147,820 | Scott | July 27, 1915 |
| 1,820,653 | Ernst | Aug. 25, 1931 |
| 2,127,718 | Dalrymple | Aug. 23, 1938 |
| 2,296,071 | Thumim | Sept. 15, 1942 |
| 2,327,920 | Moohl | Aug. 24, 1943 |
| 2,467,756 | Leitzel | Apr. 19, 1949 |
| 2,512,154 | Herwald et al. | June 20, 1950 |
| 2,679,234 | Robinson | May 25, 1954 |